(12) United States Patent
Bai et al.

(10) Patent No.: US 10,292,150 B2
(45) Date of Patent: *May 14, 2019

(54) METHOD FOR INFORMATION TRANSMISSION, BASE STATION AND USER EQUIPMENT

(71) Applicant: Huawei Technologies Co., Ltd., Shenzhen (CN)

(72) Inventors: Wei Bai, Shenzhen (CN); Lei Wan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,096

(22) Filed: Jul. 13, 2018

(65) Prior Publication Data

US 2018/0343643 A1 Nov. 29, 2018

Related U.S. Application Data

(63) Continuation of application No. 14/474,985, filed on Sep. 2, 2014, now Pat. No. 10,064,169, which is a (Continued)

(30) Foreign Application Priority Data

Mar. 2, 2012 (CN) .......................... 2012 1 0053655

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0007* (2013.01); *H04W 52/325* (2013.01);
(Continued)

(58) Field of Classification Search
CPC ............ H04W 72/042; H04W 52/325; H04W 72/005; H04W 16/08; H04W 48/08; H04W 16/26; H04L 5/0007
See application file for complete search history.

(56) References Cited

U.S. PATENT DOCUMENTS

| 2008/0117852 A1 | 5/2008 | Bennett et al. |
| 2012/0327896 A1 | 12/2012 | Lee et al. |
| 2013/0114521 A1* | 5/2013 | Frenne .................. H04L 5/0053 370/329 |

FOREIGN PATENT DOCUMENTS

| CN | 101198109 A | 6/2008 |
| CN | 101969663 A | 2/2011 |

(Continued)

OTHER PUBLICATIONS

"Evaluation of LTE coverage limitations", 3GPP TSG RAN WG1 Meeting #68, R1-120058, XP050562645, Dresden, Germany, 3rd Generation Partnership Project, Valbonne, France (Feb. 6-10, 2012).
(Continued)

*Primary Examiner* — Jackie Zuniga Abad
(74) *Attorney, Agent, or Firm* — Leydig, Voit & Mayer, Ltd.

(57) ABSTRACT

The present disclosure provides a method for information transmission, a base station and a user equipment. The method for information transmission includes: performing a coverage enhancement processing on control information and data information; transmitting the control information and the data information, which the coverage enhancement processing is performed on, to a user equipment; and transmitting coverage enhancement indication information to the user equipment, where the coverage enhancement indication information is used for indicating the user equipment to acquire the control information and the data information which the coverage enhancement processing is performed
(Continued)

on. The technical solutions of the present disclosure are capable of improving the downlink coverage range.

8 Claims, 5 Drawing Sheets

Related U.S. Application Data continuation of application No. PCT/CN2013/072124, filed on Mar. 4, 2013.

(51) Int. Cl.
    *H04W 72/00*     (2009.01)
    *H04W 52/32*     (2009.01)
    *H04W 16/26*     (2009.01)
    *H04W 48/08*     (2009.01)
    *H04W 16/08*     (2009.01)

(52) U.S. Cl.
    CPC .......... *H04W 72/005* (2013.01); *H04W 16/08* (2013.01); *H04W 16/26* (2013.01); *H04W 48/08* (2013.01)

(56) References Cited

FOREIGN PATENT DOCUMENTS

| | | |
|---|---|---|
| EP | 2384064 B1 | 12/2016 |
| WO | 2010083646 A1 | 7/2010 |

OTHER PUBLICATIONS

"Potential Solutions for UL Coverage Enhancement", 3GPP TSG RAN WG1 Meeting #68, R1-120511, XP050563329, Dresden, Germany, 3rd Generation Partnership Project, Valbonne, France (Feb. 6-10, 2012).

"3rd Generation Partnership Project; Technical Specification Group Radio Access Network; Evolved Universal Terrestrial Radio Access (E-UTRA); LTE Coverage Enhancements (Release 11)," 3GPP TR 36.824 V1.0.0, XP050563483, 3rd Generation Partnership Project, Valbonne, France (Feb. 2012).

\* cited by examiner

| 0 | 1 | 2 | 3 | 4 | 5 | 6 | 7 | 8 | 9 |
|----|---|----|---|---|----|---|----|---|---|
| DL | S | UL | F | F | DL | S | UL | F | F |
FIG. 6
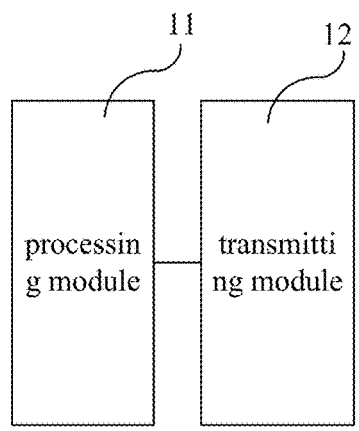
FIG. 7
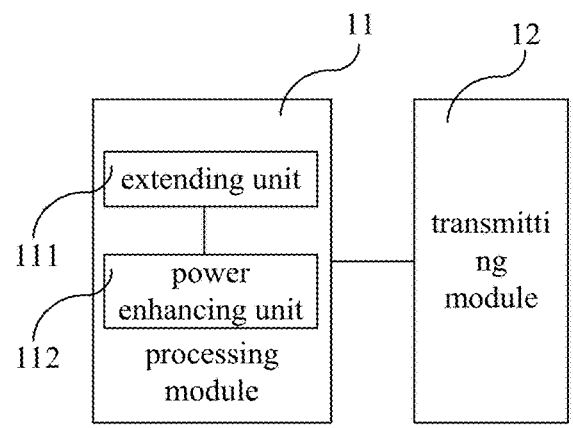
FIG. 8

METHOD FOR INFORMATION TRANSMISSION, BASE STATION AND USER EQUIPMENT

CROSS-REFERENCE TO RELATED APPLICATIONS

This application is a continuation of U.S. patent application Ser. No. 14/474,985, filed on Sep. 2, 2014, which is a continuation of International Patent Application No. PCT/CN2013/072124, filed on Mar. 4, 2013, which claims priority to Chinese Patent Application No. 201210053655.6, filed on Mar. 2, 2012. All of the afore-mentioned patent applications are hereby incorporated by reference in their entireties.

TECHNICAL FIELD

Embodiments of the present disclosure relate to the field of communication technologies and, in particular, to a method for information transmission, a base station and a user equipment.

BACKGROUND

With the development of mobile communication technologies, in order to realize the reuse of spectrum resources for different geographic locations, telecom operators lay more and more low-power nodes, so as to provide higher data rate for a user equipment (UE). When there are not much users near a low-power nodes, these low-power nodes may increase the coverage to cover distant UEs, in this way, the utilization of these low power nodes can be increased, and the cost of the network distribution can be reduced.

Currently, in the 3rd generation partnership project (3GPP) long term evolution system, in order to realize the transmission of the downlink control information and the downlink service data, the following are set up in the downlink physical channel: a synchronization signal, a physical broadcast channel (PBCH), a physical control format indicator channel (PCFICH), a physical hybrid automatic repeat request channel (PHICH), a physical downlink control channel (PDCCH), a physical downlink shared channel (PDSCH) and pilot signals, and etc. A user equipment synchronizes with an eNB by detecting the synchronization signals, where the synchronization signals are periodic signals, and the synchronization time may be extended, so that the synchronization signal can cover more distant UEs.

In the conventional LTE system, when the downlink bandwidth is 10 MHz, the downlink transmit power of an evolved base station eNB is 46 dBm, and the maximum uplink transmit power of a UE is 23 dBm. Therefore, the uplink coverage and the downlink coverage are substantially the same. For a low power node, the downlink transmit power of the low power node and the maximum uplink transmit power of a UE are both 23 dBm, which makes the downlink coverage area much smaller than the uplink coverage area. So, in the prior art, the downlink coverage area of the low power node is small, therefore, the more distant UEs cannot be covered.

SUMMARY

The present disclosure provides a method for information transmission, a base station and a user equipment, which are used for expanding the downlink coverage.

In an aspect, the present disclosure provides a method for information transmission, including:

performing a coverage enhancement processing on control information and data information;

transmitting the control information and the data information, which the coverage enhancement processing is performed on, to a user equipment; and transmitting coverage enhancement indication information to the user equipment, where the coverage enhancement indication information is used for indicating the user equipment to acquire the control information and the data information which the coverage enhancement processing is performed on.

The step of performing the coverage enhancement processing on the control information and the data information includes:

extending a time domain resource and/or a frequency domain resource occupied by the control information and the data information; and/or enhancing transmit power of a physical resource element (RE) which transmits the control information and the data information.

The step of performing the coverage enhancement processing on the control information and the data information includes:

performing the coverage enhancement processing on the control information and the data information, which is transmitted to the user equipment, in a unit of a radio data frame or a subframe.

The data information includes physical downlink shared channel (PDSCH) data, the control information includes physical broadcast channel (PBCH) data and physical downlink control channel (PDCCH) data, or the control information includes physical broadcast channel (PBCH) data, physical downlink control channel (PDCCH) data and pilot signal data.

When the data information is the PDSCH data, the extending the time domain resource and/or the frequency domain resource occupied by the PDSCH data includes:

performing discrete Fourier transformation spread orthogonal frequency division multiplexed (DFT-S-OFDM) modulation to the PDSCH data to extend the time domain resource and/or the frequency domain resource occupied by the PDSCH data, where, length of the DFT-S-OFDM modulated PDSCH data is increased.

When the control information is the PBCH data and the PDCCH data, the extending the time domain resource and/or the frequency domain resource occupied by the PBCH data and the PDCCH data includes:

extending the PBCH data at a position outside first four orthogonal frequency division multiplexed (OFDM) symbols of a first slot of a 0th subframe in a radio frame, and/or a position outside 6 physical resource blocks (PRB) in the middle of the first slot of the 0th subframe in the radio frame; and extending the PDCCH data at a position outside 8 consecutive control channel elements (CCE) of a subframe.

The step of extending the PBCH data at the position outside the first four orthogonal frequency division multiplexed OFDM symbols of the first slot of the 0th subframe in the radio frame, and/or the position outside the 6 physical resource blocks (PRB) in the middle of the first slot of the 0th subframe in the radio frame; and extending the PDCCH data at the position outside the 8 consecutive control channel elements (CCE) of the subframe, includes:

extending the PBCH data and the PDCCH data at a guard period GP of a special subframe in a time division duplex (TDD) system;

extending the PBCH data and the PDCCH data outside a control area and a pilot area of a normal subframe; or extending the PBCH data and the PDCCH data outside a control area of a multicast broadcast single frequency network (MBSFN) subframe, where the MBSFN subframe is configured by a normal subframe.

When the data information is the PDSCH data, and the control information is the PBCH data and the PDCCH data, the enhancing the transmit power of the physical resource element (RE) which transmits the PBCH data, the PDCCH data and the PDSCH data, includes:

enhancing the transmit power of the RE in an OFDM symbol which transmits the PBCH data, the PDCCH data and the PDSCH data.

The step of enhancing the transmit power allocated to the RE in the OFDM symbol which transmits the PBCH data, the PDCCH data and the PDSCH data specifically includes: enhancing the transmit power allocated to the RE in the OFDM symbol which transmits the PBCH data, the PDCCH data, which concentrates on a part of PRBs which are consecutive in the frequency domain, and the PDSCH data.

When the data information is the PDSCH data, and the control information is the PBCH data and the PDCCH data, the enhancing the transmit power of the RE which transmits the PBCH data, the PDCCH data and the PDSCH data, includes:

enhancing the transmit power of the RE in a first OFDM symbol set which transmits the PDCCH;

enhancing the transmit power of the RE in a second OFDM symbol set which transmits the PDSCH; and enhancing the transmit power allocated to the RE in a third OFDM symbol set which transmits the PBCH.

The step of transmitting the coverage enhancement indication information to the user equipment includes:

transmitting the coverage enhancement indication information to the user equipment through broadcasting;

transmitting the coverage enhancement indication information to the user equipment through a radio resource control RRC protocol signaling; or transmitting the coverage enhancement indication information to the user equipment through a combination of an RRC signaling and PDDCH data.

The coverage enhancement indication information includes indication information which indicates that the base station has been in a state of coverage enhancement; or the coverage enhancement indication information includes location information which indicates an extended time domain resource and/or frequency domain resource occupied by the control information and the data information, and when a DFT-S-OFDM modulation is performed on the PDSCH data, the coverage enhancement indication information further includes a modulation mode and a ratio between length of the data before the DFT-S-OFDM modulation and length of the data after the DFT-S-OFDM modulation; or the coverage enhancement indication information includes location information of a physical resource element (RE), of which the transmit power is enhanced, of the control information and the data information.

In another aspect, another method for information transmission is provided, which includes:

receiving, by a user equipment, coverage enhancement indication information transmitted by a base station, where the coverage enhancement indication information is used for indicating the user equipment to acquire control information and data information after a coverage enhancement processing; and acquiring, by the user equipment, the control information and the data information according to the coverage enhancement indication information.

The coverage enhancement indication information includes indication information which indicates that the base station has been in a state of coverage enhancement, and the acquiring, by the user equipment, the control information and the data information according to the coverage enhancement indication information, includes:

acquiring pre-stored location information of an extended time domain resource and/or an extended frequency resource occupied by the control information and the data information, and when a DFT-S-OFDM modulation is performed on PDSCH data of the data information, also acquiring a modulation mode and a ratio between length of the data before the DFT-S-OFDM modulation and length of the data after the DFT-S-OFDM modulation;

acquiring the control information and the data information from the time domain resource and the frequency resource according to the location information of the extended time domain resource and/or the extended frequency resource occupied by the control information and the data information, or, acquiring the control information and the data information from the time domain resource and the frequency resource according to the location information of the extended time domain resource and/or the extended frequency resource occupied by the control information and the data information, and the ratio between the length of the data before the DFT-S-OFDM modulation and the length of the data after the DFT-S-OFDM modulation; or acquiring pre-stored location information of a physical resource element (RE) which transmits the control information and the data information at enhanced transmit power; and acquiring the control information and the data information from the time domain resource and the frequency resource according to the location information of the physical resource element RE which transmits the control information and the data information at the enhanced transmit power.

In another aspect, the present disclosure provides a base station, which includes:

a processing module, configured to perform a coverage enhancement processing on control information and data information;

a transmitting module, configured to send the control information and the data information, which the coverage enhancement processing is performed on, to a user equipment, and send coverage enhancement indication information to the user equipment, where the coverage enhancement indication information is used for indicating the user equipment to acquire the control information and the data information which the coverage enhancement processing is performed on.

The processing module includes:

an extending unit, configured to extend a time domain resource and/or a frequency domain resource occupied by the control information and the data information; and/or a power enhancing unit, configured to enhance transmit power of a physical resource element RE which transmits the control information and the data information.

The data information includes physical downlink shared channel (PDSCH) data, the control information includes physical broadcast channel (PBCH) data and physical downlink control channel (PDCCH) data, or the control information includes physical broadcast channel (PBCH) data, physical downlink control channel (PDCCH) data and pilot signal data.

The extending unit is configured to: when the data information is the PDSCH data, perform discrete Fourier transformation spread orthogonal frequency division multiplexed (DFT-S-OFDM) modulation to the PDSCH data to extend the time domain resource and/or the frequency domain resource occupied by the PDSCH data, where, length of the DFT-S-OFDM modulated PDSCH data is increased.

The extending unit is configured to: when the control information is the PBCH data and the PDCCH data, extend the PBCH data at a position outside first four orthogonal frequency division multiplexed (OFDM) symbols of a first slot of a 0th subframe in a radio frame, and/or a position outside 6 physical resource blocks (PRB) in the middle of the first slot of the 0th subframe in the radio frame; and extend the PDCCH data at a position outside 8 consecutive control channel elements CCE of a subframe.

The power enhancing unit is configured to: when the data information is PDSCH data, the control information is PBCH data and PDCCH data, enhance the transmit power of the RE in an OFDM symbol which transmits the PBCH data, the PDCCH data and the PDSCH data.

The power enhancing unit is configured to: when the data information is PDSCH data, the control information is PBCH data and PDCCH data, enhance the transmit power of the RE in an OFDM symbol which transmits the PBCH data, the PDCCH data and the PDSCH data.

The power enhancing unit is configured to: when the data information is the PDSCH data, and the control information is the PBCH data and the PDCCH data, enhancing the transmit power of the RE in a first OFDM symbol set which transmits the PDCCH; enhance the transmit power of the RE in a second OFDM symbol set which transmits the PDSCH; and enhance the transmit power allocated to the RE in a third OFDM symbol set which transmits the PBCH. In another aspect, the present disclosure further provides a user equipment, which includes:

a receiving module, configured to receive coverage enhancement indication information transmitted by a base station, where the coverage enhancement indication information is used for indicating the user equipment to acquire control information and data information after a coverage enhancement processing; and an acquiring module, configured to acquire the control information and the data information according to the coverage enhancement indication information.

The acquiring module includes:

a first acquiring unit, configured to: when the receiving module receives coverage enhancement indication information includes indication information which indicates that the base station has been in a state of coverage enhancement, acquire pre-stored location information of an extended time domain resource and/or an extended frequency resource occupied by the control information and the data information, and when a DFT-S-OFDM modulation is performed on PDSCH data of the data information, also acquire a modulation mode and a ratio between length of the data before the DFT-S-OFDM modulation and length of the data after the DFT-S-OFDM modulation; and a second acquiring unit, configured to acquire the control information and the data information from the time domain resource and the frequency resource according to the location information of the extended time domain resource and/or the extended frequency resource occupied by the control information and the data information, or, acquire the control information and the data information from the time domain resource and the frequency resource according to the location information of the extended time domain resource and/or the extended frequency resource occupied by the control information and the data information, and the ratio between the length of the data before the DFT-S-OFDM modulation and the length of the data after the DFT-S-OFDM modulation;

or the acquiring module includes:

a third acquiring unit, configured to acquire pre-stored location information of a physical resource element (RE) which transmits the control information and the data information at enhanced transmit power; and a fourth acquiring unit, configured to acquire the control information and the data information from the time domain resource and the frequency resource according to the location information of the RE which transmits the control information and the data information at the enhanced transmit power.

According to the technical solutions provided by the present disclosure, the base station transmits the control information and the data information to the user equipment after performing coverage enhancement processing on the control information and the data information, and transmits coverage enhancement indication information to the user equipment, where the coverage enhancement indication information is used for indicating the user equipment to acquire the control information and the data information which the coverage enhancement processing is performed on. According to the above technical solution, the downlink coverage of the base station can be effectively extended, and the indication information enables the user equipment to receive the control information and the data information effectively.

BRIEF DESCRIPTION OF DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate are merely some embodiments of the present disclosure, and persons of ordinary skill in the art may still derive other drawings from these accompanying drawings without creative effort.

FIG. 6 is a schematic frame structural diagram of a radio frame according to another embodiment of the present disclosure;

FIG. 7 is a first schematic structural diagram of a base station according to an embodiment of the present disclosure;

FIG. 8 is a second schematic structural diagram of a base station according to an embodiment of the present disclosure;

DESCRIPTION OF EMBODIMENTS

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part rather than all embodiments of the present disclosure. All other embodiments obtained by persons of ordinary skill in the art based on embodiments of the present disclosure without creative effort shall fall within the protection scope of the present disclosure.

Figure 1:
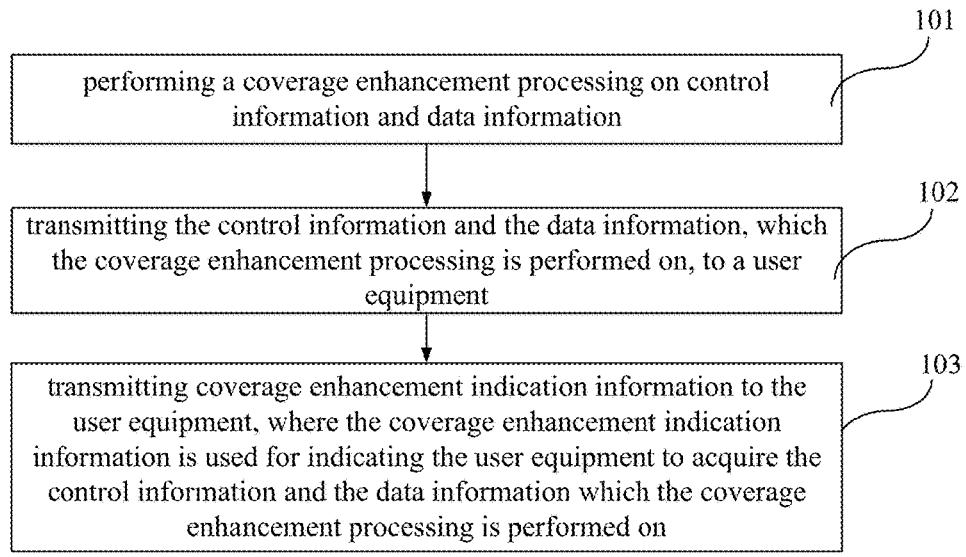
FIG. 1 is a schematic flowchart of a method for information transmission according to an embodiment of the present disclosure.

Aiming at the defect that the downlink coverage range of base stations such as low power nodes are small in the prior art, a method for information transmission is provided by embodiments of the present disclosure. FIG. 1 is a schematic flowchart of a method for information transmission according to an embodiment of the present disclosure. As shown in FIG. 1, the method includes the following steps:

Step 101: performing a coverage enhancement processing on control information and data information;

Step 102: transmitting the control information and the data information, which the coverage enhancement processing is performed on, to a user equipment; and Step 103: transmitting coverage enhancement indication information to the user equipment, where the coverage enhancement indication information is used for indicating the user equipment to acquire the control information and the data information which the coverage enhancement processing is performed on.

In the method for information transmission provided by the above embodiment of the present disclosure, the base station transmits the control information and the data information to the user equipment after performing coverage enhancement processing on the control information and the data information, and transmits coverage enhancement indication information to the user equipment, where the coverage enhancement indication information is used for indicating the user equipment to acquire the control information and the data information which the coverage enhancement processing is performed on. According to the above technical solution, the downlink coverage of the base station can be effectively extended, and the indication information enables the user equipment to receive the control information and the data information effectively. In this embodiment, the execution order of the steps 101-103 are not limited, that is, the base station may transmit the coverage enhancement indication information at the same time when performing the coverage enhancement processing in step 101, and then transmit the control information and the data information, which the coverage enhancement processing is performed on, to the user equipment; or, the base station may firstly transmit the coverage enhancement indication information after determining which mode to use to perform the coverage enhancement processing, and subsequently perform the coverage enhancement processing on the control information and the data information to be transmitted to the user equipment, and transmit the control information and the data information, which the coverage enhancement processing is performed on, to the user equipment.

In a technical solution provided by another embodiment, the performing the coverage enhancement processing on the control information and the data information in step 101 may include three modes. A first mode is to extend a time domain resource and/or a frequency domain resource occupied by the control information and the data information; a second mode is to enhance transmit power of a physical resource element (RE) which transmits the control information and the data information; a third mode is to perform both of the above two modes to implement the coverage enhancement processing, that is, enhancing the transmit power of the RE which transmits the control information and the data information after extending the time domain resource and/or the frequency domain resource for the control information and the data information.

In another embodiment, considering that when the base station needs to cover distant UEs, the value of PCFICH data may be fixed, or the PCFICH data may be notified to the UE through a radio resource control (RRC) signaling, that is, the PCFICH data may be notified to the UE by using PDCCH data or PDSCH data, so that the distant UE does not need to detect the PCFICH data directly; the PHICH data may also be transmitted through the PDCCH and notified to the UE, in this way, the distant UE does not need to detect the PHICH data. Therefore, when extending the coverage of the base station such as the low power node to cover the distant UEs, only the downlink coverage range of PBCH data, PDCCH data and PDSCH data need to be considered, that is, in the embodiment corresponding to FIG. 1, the control information includes the PBCH data and the PDCCH data, and the data information includes the PDSCH data. For the control information which is pilot signal data, whether the coverage enhancement processing should be performed may be determined according to actual needs. Therefore, the control information may also include the PBCH data, the PDCCH data, and the pilot signal data.

In another embodiment, performing the coverage enhancement processing on the control information and the data information in step 101 may be: performing the coverage enhancement processing on the control information and the data information, which is transmit to the user equipment, in a unit of a radio data frame or a subframe. For example, for the PBCH data which is valid in the radio frame unit, the coverage enhancement processing on the control information and the data information, which is transmit to the user equipment, may be performed in a unit of a radio data frame, that is, the coverage enhancement processing is performed in the whole radio frame; however, for the PDCCH data, which is valid in the subframe unit, the coverage enhancement processing on the control information and the data information, which is transmit to the user equipment, may be performed in a unit of a subframe, that is, the coverage enhancement processing is performed in the subframe.

In still another embodiment, the performing the coverage enhancement processing on the control information and the data information in step 101 of the above embodiment may specifically include: extending the time domain resource and/or the frequency domain resource occupied by the PBCH data, the PDCCH data and the PDSCH data. After transmitting the coverage enhancement indication information, the PBCH data, the PDCCH data and the PDSCH data to the user equipment, the user equipment may acquire the PBCH data, the PDCCH data and the PDSCH data from the radio frame according to the coverage enhancement indication information. In this technical solution, according to the above coverage enhancement mode, the difficulty of parsing of the user equipment can be reduced, thus the downlink coverage range of the base station can be expanded effectively. This method may be applied not only to low power nodes such as pico base stations, relay stations and the home base stations, but also to the situations that need to expand the downlink coverage range, for example, to a situation that a normal macro base station needs to expand the downlink coverage range.

In another embodiment, the extending the time domain resource and/or the frequency domain resource occupied by the PDSCH data may specifically be: performing discrete Fourier transformation spread orthogonal frequency division multiplexed (DFT-S-OFDM) modulation to the PDSCH data to extend the time domain resource and/or the frequency domain resource occupied by the PDSCH data, where, in the modulation, the length of the output data is larger than the length of the input data, for instance, when transmitting 100 PDSCH data, 100 REs are needed, if DFT-S-OFDM modulation is performed to the PDSCH data, 1200 data can be obtained, and then 1200 REs are needed, that is, the resources occupied by the PDSCH data are extended. In this embodiment, the base station use the extended resource to transmit the PDSCH data to the user equipment, after receiving the PDSCH data and the power enhancement indication information, the user equipment may acquire the PDSCH data from the specific time domain resource and frequency domain resource which the coverage enhancement processing is performed on. Specifically, as shown in FIG. 2, the DFT-S-OFDM modulation in the above embodiment includes the following steps:

firstly, performing a discrete Fourier transformation (DFT) to the PDSCH data to be transmitted, then performing a sub-carrier mapping to the obtained data, further, performing an inverse fast Fourier transform (IFFT), and after that, performing a cyclic prefix (CP) insertion (CP insertion), then, the DFT-S-OFDM modulation is completed.

Figure 2:
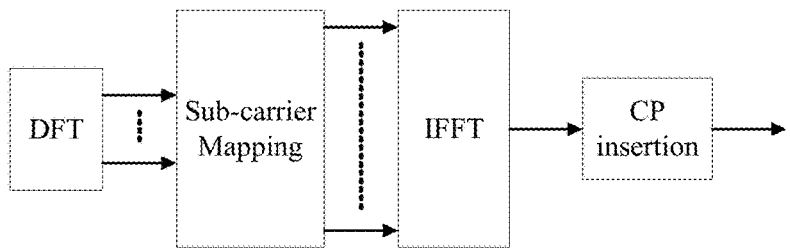
FIG. 2 is a schematic theoretic diagram of a DFT-S-OFDM modulation according to an embodiment of the present disclosure.

When the length of the input data in FIG. 2, i.e., the length of data before the DFT, is smaller than the length of the output data, i.e., the length of the data after IFFT, the amount of the PDSCH data can be increased and, thus, the effect of spreading spectrum can be achieved, thereby expanding the coverage range of the PDSCH. The following shows the gain values of the system obtained at different length of the input data and the output data:

| Length of the input data | Length of the output data | Gain |
| --- | --- | --- |
| 600 | 1200 | 3 |
| 300 |  | 6 |
| 150 |  | 9 |
| 75 |  | 12 |
| 37 |  | 15 |

In another embodiment, for the base station, transmitting an indication massage to notify the UE to acquire the PDSCH data at the time domain resource and the frequency domain resource, which the coverage enhancement processing is performed on, is also needed, herein, two modes are included. In one mode, how to extend the time domain resource and/or the frequency domain resource occupied by the PDSCH data, if the coverage enhancement is performed, is preset in both the base station and the UE, that is, the specific time domain resources and/or the frequency domain resources from which to obtain the PDSCH data, when the coverage enhancement is performed, is preset, in this case, the indication information only needs to indicate that the base station has already been in the state of coverage enhancement; in the other mode, the specific time domain resources and/or the frequency domain resources from which to obtain the PDSCH data is notified to the UE by the base station through the above indication information when the coverage enforcement occurs, rather than being preset in both the base station and the user equipment.

In another embodiment, the extending the time domain resource and/or the frequency domain resource occupied by the PBCH data and PDCCH data in step 101 may specifically include:

extending the PBCH data at a position outside the first four OFDM symbols of a first slot of a 0th subframe in a radio frame, and/or a position outside the 6 physical resource blocks (PRB) in the middle of the first slot of the 0th subframe in the radio frame; and extending the PDCCH data at a position outside 8 consecutive CCEs of a subframe.

In this embodiment, the base station transmits the PBCH data and the PDCCH data to the user equipment by using the extended time domain resources and the extended frequency domain resources, and after the user equipment receives the PBCH data and PDCCH data and the coverage enhancement indication information, the user equipment may acquire the PBCH data and the PDCCH data from the specific corresponding time domain resource and frequency resource which the coverage enhancement processing is performed on.

Specifically, in the existing LTE communication system, no matter the TDD system or the FDD system, one radio frame includes 10 subframes, i.e., the 0th subframe to the 9th subframe, and each subframe is composed of two slots which are the 0th slot and the first slot; each slot of the radio frame includes a plurality of consecutive PRBs in the frequency domain, where the number of the PRBs is subject to the bandwidth of the downlink channel, e.g., for a downlink channel of 20 MHz, the number of the included PRBs is 100.

In the existing LTE communication system, the number of information bits of the PBCH data is 40 bit, and the used resources are 960 REs; however, the number of information bits of the PDCCH data is 47 bit, and the used resources are 1, 2, 4 or 8 CCE(s), where each CCE includes 36 REs, therefore, the PDCCH data occupies 288 Res at most. In the current LTE communication system, a PBCH may exist in 4 consecutive radio frames, where, in each radio frame, the time domain position is the first four OFDM symbols of the first time slot in the 0th subframe, and the frequency domain position is the 6 physical resource blocks in the middle of the first time slot in the 0th subframe. In the technical solution of the present disclosure, the extending is performed outside the time domain resources, outside the frequency domain resources, or outside both the time domain resources and the frequency domain resources, so as to increase the amount of transmitted data, thereby the difficulty of parsing of the user equipment is reduced and the downlink coverage of the data is expanded.

Specifically, the increasing the time domain resources for the PBCH data may be at the last 4 frequency division multiplexing symbols of the 0 time slot in the 0th subframe, the first 4 frequency division multiplexing symbols of the fifth subframe, or the last 4 frequency division multiplexing symbols of the fifth subframe in the radio frame; the increasing the frequency domain resources may be extending the PBCH data at 12 PRBs in the middle of the corresponding time slot in the radio frame. In this way, a total gain of 9 dB can be provided.

For the PDCCH data, it is configured in the prior art that the PDCCH data may use 8 consecutive CCEs at most, whereas in the embodiments of the present disclosure, the PDCCH data may use more than 8 CCEs. Specifically, in the LTE system with a configuration of 20 MHz and 4×4 antennas, when the PCFICH data is configured to be 3, one subframe includes 76 CCEs at most, in this case, the PDCCH data may be allowed to occupy all the 76 CCEs, and in this case, a total gain of 9.7 dB can be provided.

In this embodiment, the base station transmits the PBCH data and the PDCCH data to the user equipment by using the extended time domain resources and the extended frequency domain resources occupied by the PBCH data and the PDCCH data, and after the user equipment receives the PBCH data and the PDCCH data and the coverage enhancement indication information, the user equipment may obtain the PBCH data and PDCCH data from the specific corresponding time domain resource and frequency resource which the coverage enhancement processing is performed on.

In another embodiment, besides the extending the time domain resources and/or the frequency domain resources occupied by the PBCH data and PDCCH data described above, there may be other modes to implement the extending. For example, for a normal subframe, the PBCH data and the PDCCH may be extended at positions outside the control area and the pilot area. Or, for a normal subframe, it may be configured to be a multicast broadcast single frequency network (MBSFN) subframe, and the PBCH data and the PDCCH may be extended outside the MBSFN subframe. For example, the PBCH data and the PDCCH are extended at the 12 or 13 symbols except the first symbol.

In this embodiment, the base station transmits the PBCH data and the PDCCH data to the user equipment by using the extended time domain resources and the extended frequency domain resources occupied by the PBCH data and the PDCCH data, and after the user equipment receives the PBCH data and the PDCCH data and the coverage enhancement indication information, the user equipment may obtain the PBCH data and PDCCH data from the specific corresponding time domain resource and frequency resource which the coverage enhancement processing is performed on.

Figure 3:
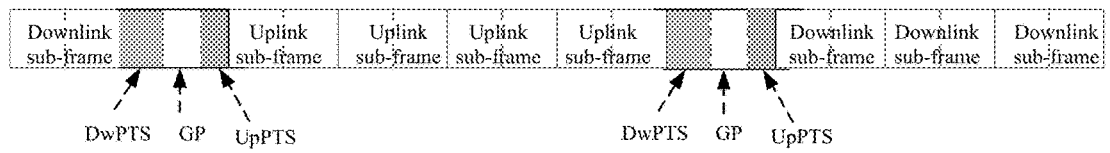
FIG. 3 is a schematic frame structural diagram of a TDD radio frame according to an embodiment of the present disclosure.

Besides, in another embodiment, for the TDD system, the PBCH data and the PDCCH may be extended at the guard period of the special subframe of the TDD system. Specifically, as shown in FIG. 3, in a TDD radio frame, the 10 subframes include an uplink subframe UL, a downlink subframe DL and a special subframe between the uplink subframe and the downlink subframe. The special subframe includes a downlink pilot time slot (DwPTS), an uplink pilot time slot (UpPTS), and guard period (GP). The proportion of the three parts in the special subframe is 3:10:1. For the 10 OFDM symbols in the GP, the first 9 symbols may be chosen to extend the PBCH data and the PDCCH data. In specific implementation, the PBCH data and the PDCCH data may be simultaneously extended at the GPs of the special subframe of the same TDD wireless frame data, or the PBCH data and the PDCCH data may be extended respectively at the GPs of the special subframes of different TDD wireless frames.

In this embodiment, the base station transmits the PBCH data and the PDCCH data to the user equipment by using the extended time domain resources and the extended frequency domain resources occupied by the PBCH data and the PDCCH data, and after the user equipment receives the PBCH data and the PDCCH data and the coverage enhancement indication information, the user equipment may obtain the PBCH data and PDCCH data from the specific corresponding time domain resource and frequency resource which the coverage enhancement processing is performed on.

In another embodiment, after the cover range of the PBCH data and the PDCCH data are enhanced, the time domain resources and the frequency domain resources occupied by the PBCH data and the PDCCH data are also changed, therefore, the following mode may be adopted: time domain resources and the frequency domain resources which will be occupied by the PBCH and the PDCCH data after the coverage enhancement occurs are preset in the base station and the UE, therefore, the indication information which is transmitted after the coverage resource enhancement occurs, may only need to indicate that the base station is in the state of coverage enhancement; or, the specific time domain resources and/or the frequency domain resources from which to obtain the PDSCH data is notified to the UE by the base station through the above indication information when the coverage enforcement occurs, rather than being preset in both the base station and the user equipment. After the base station transmits the above data to the user equipment, and the power enhancement indication information is received by the user equipment, the user equipment may acquire the data from the specific corresponding time domain resources and frequency domain resources which the coverage enhancement processing is performed on.

In another embodiment, the performing the coverage enhancement processing on the control information and the data information to be transmitted to the user equipment in the step 101 in the embodiment corresponding to FIG. 1, may also be enhancing the transmit power of the REs which transmit the PBCH data, the PDCCH data and the PDSCH data. Since the transmit power of the REs which transmit the PBCH data, the PDCCH data and the PDSCH data is enhanced, the difficulty of parsing the data of the UE is reduced after the UE receives the above data, thus the downlink coverage of the base station can be expanded effectively.

There may be many modes for enhancing the transmit power of the REs which transmit the PBCH data, the PDCCH data and the PDSCH data. For example, during the transmit power allocation, enhance the transmit power allocated to the REs in the OFDM symbols which transmit the PBCH data, the PDCCH data and the PDSCH data. For example, all the transmitting power may be allocated to the REs which transmit the above three types of data. It is mainly considered the fact that not all the REs in each OFDM symbol carry any kind of the above data. The transmit power is not allocated to those REs carrying none of the above data any more, therefore, the transmit power of REs that transmits any kind of the above data can be enhanced, while keeping the balance of the total transmit power of the base station.

In another embodiment, in further, taking into account that the PDCCH data are distributed quite sparse in the prior art, while the PBCH data and the PDSCH data are mainly distributed on the same physical resource block, therefore, the PDCCH data may be firstly concentrated to a part of PRBs which are consecutive in the frequency domain, and then the transmit power allocated to the OFDM symbol which transmits the PBCH data, the PDCCH data, which concentrates on a part of PRBs which are consecutive in the frequency domain, and the PDSCH data is enhanced. Specifically, the PDCCH data may be concentrated to 6 physical resource blocks or 12 physical resource blocks; and all the transmit power may be allocated to the REs which transmit the PBCH data, the concentrated PDCCH data and the PDSCH data.

In another embodiment, the processing of concentrating the PDCCH data may specifically be carrying the PDCCH data on 6 physical resource blocks, at the same time, the PBCH data may also be carried on the same 6 physical resource blocks, which, furthermore, may be the 6 physical resource blocks in the middle of each subframe. This facilitates the acquiring the PBCH data and the PDCCH data by the UE in further.

In another embodiment, the allocation of the transmit power may be converted by using the OFDM symbol as the time unit, and the allocation of the transmit power may also be performed in a unit of a set of some OFDM symbols, i.e., an OFDM symbol set. That is to say, the enhancing the transmit power of the REs which transmit the PBCH data, the PDCCH data and the PDSCH data, includes:

enhancing the transmit power allocated to the RE in a first OFDM symbol set which transmits the PDCCH;

enhancing the transmit power allocated to the RE in a second OFDM symbol set which transmits the PDSCH; and enhancing the transmit power allocated to the RE in a third OFDM symbol set which transmits the PBCH.

In this embodiment, the base station transmits the PDSCH data, the PBCH data and the PDCCH data to the user equipment by using this power enhancement mode, and after the user equipment receives the PBCH data, the PDCCH data and the power enhancement indication information, the user equipment may obtain the PBCH data and PDCCH data from the corresponding time domain resource and frequency resource after the power enhancement processing.

In another embodiment, considering a typical LTE system, in which, the time length of a subframe is 1 ms, and the subframe includes 14 OFDM symbols in total. The PDCCH data are mostly located on the first one, the first two or the first three symbol(s), which may be named as the first OFDM symbol set; the PBCH data are mostly located on the last 3 or 4 OFDM symbols, which may be named as the third OFDM symbol set; the PDSCH data are located on the OFDM symbols in the middle of the subframe, which may be named as the second OFDM symbol set. Therefore, the enhancing the transmit power may be performed according to the above three different OFDM symbol sets respectively.

In addition, there may be other ways for dividing the three symbol sets. For example, in the foregoing embodiments, it is provided that the PBCH data and the PDCCH data are transmitted at different GPs respectively, the different GPs constitute the first OFDM symbol set and the third OFDM symbol set, and the symbols for transmitting the PDSCH data may constitute the second OFDM symbol set. In the embodiments of the present disclosure, if the coverage enhancement processing needs to be performed on the pilot signal, it may be performed with reference to the foregoing embodiments, for example, simultaneously extend the time domain resource and/or the frequency resource occupied by the PBCH data, the PDCCH data, the pilot signal data and the PDSCH data, where the extending of the pilot signal data may be performed with reference to the method for extending the other data which includes the PBCH data, the PDCCH data, and the PDSCH data in the foregoing embodiments, so that the data amount of the pilot signal data can be increased. Or, enhance the transmit power of the REs which transmit the PBCH data, the PDCCH data, the pilot signal data and the PDSCH data, where the enhancing of the transmit power of the REs which transmit the pilot signal data may be performed with reference to the mode for enhancing the transmit power of other data.

In another embodiment, the coverage enhancement indication information which is transmitted to the user equipment may include location information which indicates extended a time domain resource and/or a frequency resource occupied by the control information and the data information, and when a DFT-S-OFDM modulation is performed on the PDSCH data, the coverage enhancement indication information further includes a modulation mode and a ratio between length of the data before the DFT-S-OFDM modulation and length of the data after the DFT-S-OFDM modulation; or the coverage enhancement indication information comprises location information of an RE, of which the transmit power is enhanced, of the control information and the data information. The two options are for the above two solutions of coverage enhancement respectively. These are the embodiments in which no preset is needed in the base station and the user equipment.

In addition, the coverage enhancement indication information may only include the indication information that indicates the base station has been in the state of coverage enhancement. In this case, the information of the extended resources and the transmit power enhancement should be preset in both the base station and the user equipment, that is, it is pre-stored in the user equipment the location information of the time domain resources and/or the frequency resources occupied by the extended control information and the extended data information, and when the PDSCH data of the data information are DFT-S-OFDM modulated, the modulation mode and the ratio between length of the data before the DFT-S-OFDM modulation and length of the data after the DFT-S-OFDM modulation are also needs to be stored; or, the location information of the REs, of which the transmitting power is enhanced, of the control information and the data information are pre-stored in the user equipment.

Specifically, for the transmitting mode of the coverage enhancement indication information, it may be transmitting the coverage enhancement indication information to the user equipment through broadcasting; or transmitting the coverage enhancement indication information to the user equipment through the RRC signaling; or transmitting the coverage enhancement indication information to the user equipment through a combination of the RRC signaling and the PDCCH data, in this implementation mode, the RRC signaling only includes the resource extending information or the power enhancement information of the PBCH data and the PDCCH data, while the resource extending information or the power enhancement information of the PDSCH data are transmitted through the PDCCH data, of course, when the PDSCH data is DFT-S-OFDM modulated, the modulation mode and the ratio of the lengths of Cyclic Prefix data may also be included.

Figure 4:
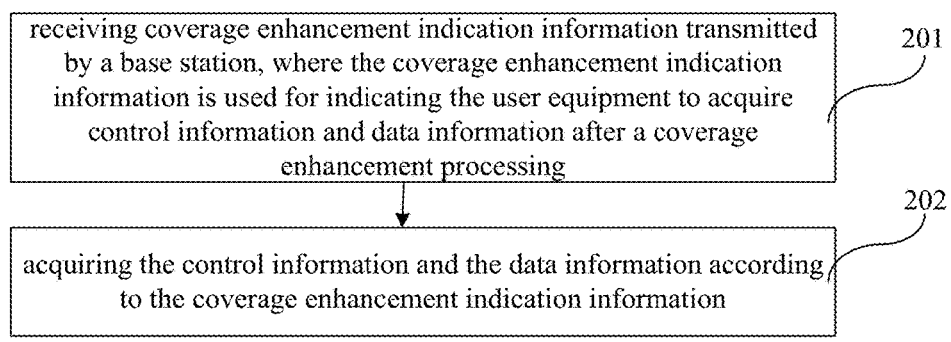
FIG. 4 is a schematic flowchart of a method for information transmission performed by a user equipment according to an embodiment of the present disclosure.

In another embodiment, referring to FIG. 4, FIG. 4 is a schematic flowchart of a method for information transmission performed by a user equipment according to an embodiment of the present disclosure, after the base station transmits the coverage enhancement indication information to the user equipment, the user equipment may perform the following steps:

Step 201: the user equipment receives coverage enhancement indication information transmitted by a base station, where the coverage enhancement indication information is used for indicating the user equipment to acquire control information and data information after a coverage enhancement processing; and Step 202: the user equipment acquires the control information and the data information according to the coverage enhancement indication information.

According to the technical solution by the above embodiment of the present disclosure, the user equipment receives the coverage enhancement indication information transmitted by the base station, then acquires the control information and the data information according to the coverage enhancement indication information, so that the user equipment can acquire the control information and the data information accurately from the resources which the coverage enhancement processing is performed on. Since the coverage enhancement is performed, the more distant user equipments can successfully acquire the control information and the data information, and thus the effect of expanding the downlink coverage range can be achieved.

In another embodiment, the coverage enhancement indication information comprises indication information which indicates that the base station has been in a state of coverage enhancement, and the acquiring, by the user equipment, the control information and the data information according to the coverage enhancement indication information in the step 202, includes:

acquiring pre-stored location information of an extended time domain resource and/or an extended frequency resource occupied by the control information and the data information, and when a DFT-S-OFDM modulation is performed on PDSCH data of the data information, also acquiring a modulation mode and a ratio between length of the data before the DFT-S-OFDM modulation and length of the data after the DFT-S-OFDM modulation; and acquiring the control information and the data information from the time domain resource and the frequency resource according to the location information of the extended time domain resource and/or the extended frequency resource occupied by the control information and the data information; if a DFT-S-OFDM modulation is performed on PDSCH data of the data information, acquiring the control information and the data information from the time domain resource and the frequency resource according to the location information of the extended time domain resource and/or the extended frequency resource occupied by the control information and the data information, and the modulation mode and the ratio between length of the data before the DFT-S-OFDM modulation and length of the data after the DFT-S-OFDM modulation;

or, in the technical solution of enhancing the transmit power, acquiring pre-stored location information of a physical resource element RE which transmits the control information and the data information at enhanced transmit power; and acquiring the control information and the data information from the time domain resource and the frequency resource according to the location information of the physical resource element RE which transmits the control information and the data information at the enhanced transmit power.

In another embodiment, the pre-stored information is carried in the coverage enhancement indication information, so that the above information may not be stored in the user equipment. The acquiring, by the user equipment, the control information and the data information according to the coverage enhancement indication information, may be: directly acquiring the above pre-stored information from the coverage enhancement indication information, and then acquiring the control information and the data information from the time domain resource and the frequency resource according to the same mode as described above.

Figure 5:
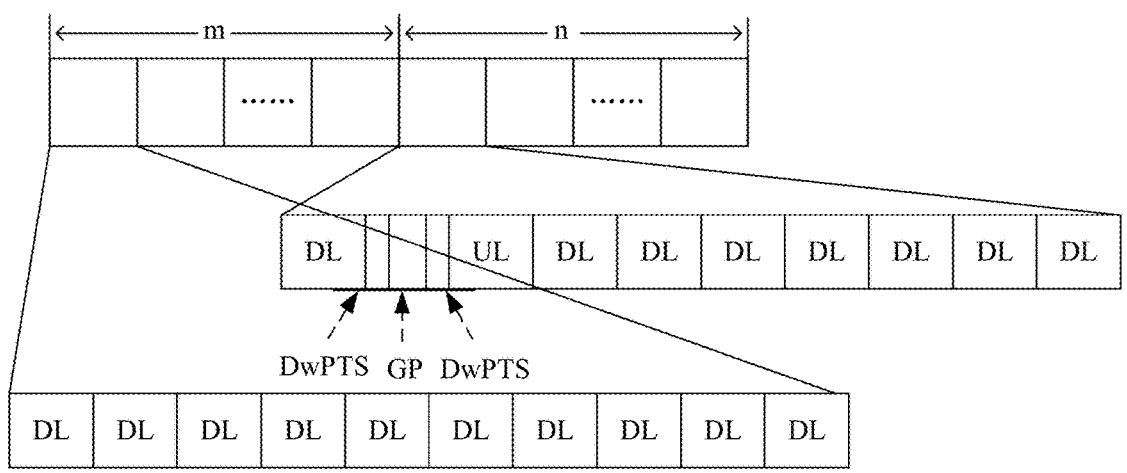
FIG. 5 is a schematic frame structural diagram of a radio frame according to an embodiment of the present disclosure.

In another embodiment, besides the above technical solutions, improvements may be made to the composition of the radio frame in the TDD system. Being different from the existing radio frame including three types of subframes, which are uplink subframes, downlink subframes and special subframes, a part of TDD radio frames may be configured to only include the downlink subframes, that is, all the subframes in the TDD radio frame are used for processing downlink services. Furthermore, such configuration may be made to several consecutive TDD radio frames, for example, as shown in FIG. 5, m consecutive TDD radio frames are configured to only include downlink subframes DL, whereas n consecutive TDD radio frames are configured to include the three types of subframes. By this way, more downlink resources can be acquired while maintaining the backward compatibility.

In addition, flexible subframes may be set in the radio frame, where the flexible subframe may be used as the uplink subframe, and may also be used as the downlink subframe. As shown in FIG. 6, the radio frame includes uplink subframes UL, downlink subframes DL, special subframes S, and flexible subframes F. In the LTE system, normally, the downlink subframes need to have cell-specific reference signals (CRS) or other RS to perform channel measurement. In order to acquire more downlink transmission resources, it may be allowed that a part of the flexible subframes do not transmit the CRS when they are used as downlink subframes, and the other part of the flexible subframes transmit the CRS as needed. For example, for the subframes whose number are 3 and 8, when they are used as downlink subframes, because of the existence of the conversion of the uplink and downlink, the channel may have changed, the transmission of the CRS is needed; in this circumstance, if the subframes whose number are 4 and 9 are then used as downlink subframes, the CRS may not be transmitted. Whether to transmit the CRS specifically may be predetermined by the system, or may be configured through the signaling.

The present disclosure also provides a base station. FIG. 7 is the schematic structural diagram of a base station according to an embodiment of the present disclosure. As shown in FIG. 7, the base station includes a processing module 11 and a transmitting module 12. The processing module 11 is configured to perform a coverage enhancement processing on control information and data information; the transmitting module 12 is configured to transmit the control information and the data information, which the coverage enhancement processing is performed on, to a user equipment, and transmit coverage enhancement indication information to the user equipment, where the coverage enhancement indication information is used for indicating the user equipment to acquire the control information and the data information which the coverage enhancement processing is performed on.

In the method for information transmission provided by the above embodiment of the present disclosure, the base station transmits the control information and the data information to the user equipment after performing coverage enhancement processing on the control information and the data information, and transmits coverage enhancement indication information to the user equipment, where the coverage enhancement indication information is used for indicating the user equipment to acquire the control information and the data information which the coverage enhancement processing is performed on. According to the above technical solution, the downlink coverage of the base station can be effectively extended, and the indication information enables the user equipment to receive the control information and the data information effectively.

In another embodiment, as shown in FIG. 8, the processing module 11 may include an extending unit 111 and/or a power enhancing unit 112, where the extending unit 111 is configured to extend a time domain resource and/or a frequency domain resource occupied by the control information and the data information; and/or; the power enhancing unit 112 is configured to enhance transmit power of a physical resource element RE which transmits the control information and the data information.

In another embodiment, the data information is PDSCH data, the control information includes PBCH data and PDCCH data, or, when pilot signal data need to be performed for the coverage enhancement, the control information includes the PBCH data, the PDCCH data and the pilot signal data.

In another embodiment, the extending unit 111 is specifically configured to: when the data information is the PDSCH data, perform discrete Fourier transformation spread orthogonal frequency division multiplexed (DFT-S-OFDM) modulation to the PDSCH data to extend the time domain resource and/or the frequency domain resource occupied by the PDSCH data, wherein, length of the DFT-S-OFDM modulated PDSCH data is increased. When the data information includes the PBCH data and the PDCCH data, the extending unit 111 is specifically configured to: extend the PBCH data at a position outside first four orthogonal frequency division multiplexed (OFDM) symbols of a first slot of a 0th subframe in a radio frame, and/or a position outside 6 physical resource blocks (PRB) in the middle of the first slot of the 0th subframe in the radio frame; and extend the PDCCH data at a position outside 8 control channel elements (CCE) of a subframe. Specifically, it may includes the following cases:

For example, the extending unit extends the PBCH data and the PDCCH data at the guard period GP of a special subframe in a time division duplex (TDD) system; or extends the PBCH data and the PDCCH data outside the control area and the pilot area of a normal subframe, or extends the PBCH data and the PDCCH data outside the control area of a multicast broadcast single frequency network (MBSFN) subframe, where the MBSFN subframe is configured by a normal subframe.

In another embodiment, when the data information is the PDSCH data, the control information is the PBCH data and the PDCCH data, the power enhancing unit 112 is configured to: enhance the transmit power of the RE in an OFDM symbol which transmits the PBCH data, the PDCCH data and the PDSCH data. Specifically, the PDCCH data may be performed centralized processing. In this embodiment, the power enhancing unit 112 is configured to enhance the transmit power allocated to the RE in the OFDM symbol which transmits the PBCH data, the PDCCH data, which concentrates on a part of PRBs which are consecutive in the frequency domain, and the PDSCH data.

Or, in another embodiment, when the control information includes the PBCH data and the PDCCH data, the power enhancing unit 112 is configured to: enhance the transmit power of the RE in a first OFDM symbol set which transmits the PDCCH; enhance the transmit power of the RE in a second OFDM symbol set which transmits the PDSCH; and enhance the transmit power allocated to the RE in a third OFDM symbol set which transmits the PBCH.

Figure 9:
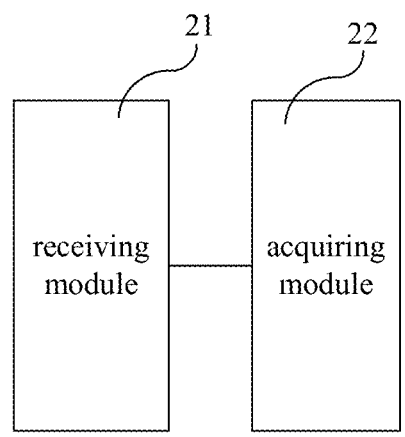
FIG. 9 is a schematic structural diagram of a user equipment according to an embodiment of the present disclosure.

The present disclosure further provides a user equipment. FIG. 9 is a schematic structural diagram of a user equipment according to an embodiment of the present disclosure. As shown in FIG. 9, the user equipment includes a receiving module 21 and an acquiring module 22, where, the receiving module 21 is configured to receive coverage enhancement indication information transmitted by a base station, where the coverage enhancement indication information is used for indicating the user equipment to acquire control information and data information after a coverage enhancement processing; the acquiring module 22 is configured to acquire the control information and the data information, which the coverage enhancement processing is performed on, according to the coverage enhancement indication information.

According to the user equipment provided by the embodiment of the present disclosure, the user equipment receives the coverage enhancement indication information transmitted by the base station, then acquires the control information and the data information from the time domain resource and the frequency domain resource, which the coverage enhancement processing is performed on, according to the coverage enhancement indication information, since the coverage enhancement indication information is at least used for indicating the user equipment to receive the control information and the data information at the time domain resources and the frequency domain resources which the coverage enhancement processing is performed on, the user equipment can acquire the control information and the data information accurately from the time domain resources and the frequency domain resources which the coverage enhancement processing is performed on. Due to the coverage enhancement, the more distant user equipment can successfully acquire the control information and the data information, and thus the effect of expanding the downlink coverage range can be achieved.

Figure 10:
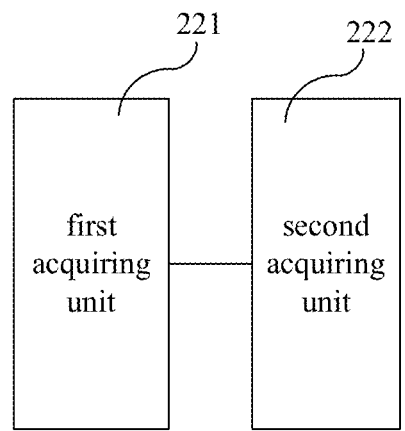
FIG. 10 is a first schematic structural diagram of an obtaining module according to the embodiment as shown in FIG. 9.
Figure 11:
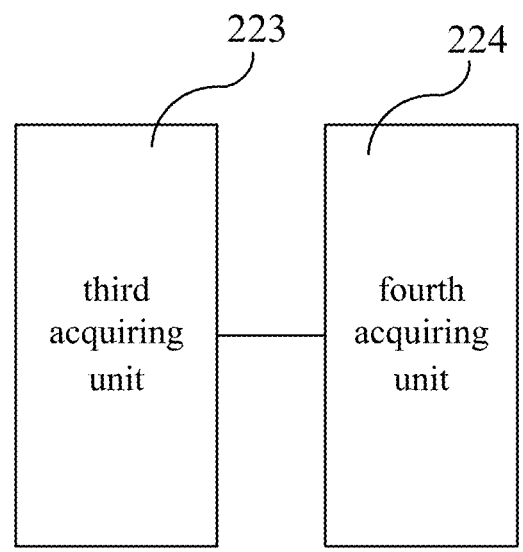
FIG. 11 is a second schematic structural diagram of an obtaining module according to the embodiment as shown in FIG. 9.

In another embodiment, as shown in FIG. 10 and FIG. 11, the acquiring module 22 may includes a first acquiring unit 221 and a second acquiring unit 222, or may includes a third acquiring unit 223 and a fourth acquiring unit 224. The first acquiring unit 221 is configured to when the receiving module receives coverage enhancement indication information includes indication information which indicates that the base station has been in a state of coverage enhancement, acquire pre-stored location information of an extended time domain resource and/or an extended frequency resource occupied by the control information and the data information, and when a DFT-S-OFDM modulation is performed on PDSCH data of the data information, also acquire a modulation mode and a ratio between length of the data before the DFT-S-OFDM modulation and length of the data after the DFT-S-OFDM modulation; the second acquiring unit 222 is configured to acquire the control information and the data information from the time domain resource and the frequency resource according to the location information of the extended time domain resource and/or the extended frequency resource occupied by the control information and the data information, or, acquire the control information and the data information from the time domain resource and the frequency resource according to the location information of the extended time domain resource and/or the extended frequency resource occupied by the control information and the data information, and the ratio between the length of the data before the DFT-S-OFDM modulation and the length of the data after the DFT-S-OFDM modulation; the third acquiring unit 223 is configured to acquire pre-stored location information of a physical resource element RE which transmits the control information and the data information at enhanced transmit power; and the fourth acquiring unit 224 is configured to acquire the control information and the data information from the time domain resource and the frequency resource according to the location information of the physical resource element (RE) which transmits the control information and the data information at the enhanced transmit power.

Persons of ordinary skill in the art may understand that all or a part of the steps of the methods according to embodiments of the present disclosure may be implemented by a program instructing relevant hardware. The program may be stored in a computer readable storage medium. When the program runs, the steps of the methods according to the embodiments are performed. The storage medium may be any medium that is capable of storing program codes, such as a ROM, a RAM, a magnetic disk, or an optical disk.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some technical features thereof, without departing from the scope of the technical solutions of embodiments of the present disclosure.

What is claimed is:

1. A method for information transmission, comprising:
    performing a coverage enhancement processing on control information, wherein performing the coverage enhancement processing on the control information comprises extending one or more of a time domain resource and a frequency domain resource occupied by the control information, wherein the control information comprises physical downlink control channel (PDCCH) data, and wherein extending the one or more of the time domain resource and the frequency domain resource occupied by the PDCCH data comprises increasing a number of control channel elements (CCEs) occupied by the PDCCH data to make the number of CCEs greater than 8;
    transmitting the control information, on which the coverage enhancement processing was performed, to a user equipment; and
    transmitting coverage enhancement indication information to the user equipment, wherein the coverage enhancement indication information indicates to the user equipment to acquire the control information on which the coverage enhancement processing was performed.

2. The method for information transmission according to claim 1, wherein the transmitting the coverage enhancement indication information to the user equipment comprises:
    transmitting the coverage enhancement indication information to the user equipment through a radio resource control (RRC) protocol signaling.

3. The method for information transmission according to claim 1, wherein the coverage enhancement indication information comprises:
    indication information that indicates that the base station has been in a state of coverage enhancement.

4. The method for information transmission according to claim 1, wherein the coverage enhancement indication information comprises:
    location information that indicates one or more of an extended time domain resource and frequency domain resource occupied by the control information.

5. A base station, comprising:
    a processor configured to perform coverage enhancement processing on control information, wherein performing the coverage enhancement processing on the control information comprises extending one or more of a time domain resource and a frequency domain resource occupied by the control information, wherein the control information comprises physical downlink control channel (PDCCH) data, and wherein extending the one or more of the time domain resource and the frequency domain resource occupied by the PDCCH data comprises increasing a number of control channel elements (CCEs) occupied by the PDCCH data to make the number of CCEs greater than 8; and
    a transmitter configured to:
        transmit the control information, on which the coverage enhancement processing was performed, to a user equipment, and
        transmit coverage enhancement indication information to the user equipment, wherein the coverage enhancement indication information indicates to the user equipment to acquire the control information on which the coverage enhancement processing was performed.

6. The base station according to claim 5, wherein the coverage enhancement indication information comprises:
    indication information that indicates that the base station has been in a state of coverage enhancement.

7. The base station according to claim 5, wherein the coverage enhancement indication information comprises:
    location information that indicates one or more of an extended time domain resource and frequency domain resource occupied by the control information.

8. The base station according to claim 5, wherein the transmitting the coverage enhancement indication information to the user equipment comprises:
    transmitting the coverage enhancement indication information to the user equipment through a radio resource control (RRC) protocol signaling.

* * * * *